US009488256B2

(12) United States Patent
Lee et al.

(10) Patent No.: US 9,488,256 B2
(45) Date of Patent: Nov. 8, 2016

(54) NUT SCREW CONVEYING DEVICE

(71) Applicant: MANDO CORPORATION, Pyeongtaek-si, Gyeonggi-do (KR)

(72) Inventors: Young-Song Lee, Gyeonggi-do (KR); I-Jin Yang, Seongnam-si (KR); Seong-Ho Choi, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 132 days.

(21) Appl. No.: 14/186,232

(22) Filed: Feb. 21, 2014

(65) Prior Publication Data
US 2014/0238167 A1 Aug. 28, 2014

(30) Foreign Application Priority Data
Feb. 25, 2013 (KR) ........................ 10-2013-0019782

(51) Int. Cl.
*F16H 25/20* (2006.01)
*F16H 25/22* (2006.01)

(52) U.S. Cl.
CPC ............ *F16H 25/2247* (2013.01); *F16H 25/20* (2013.01); *F16H 2025/228* (2013.01); *Y10T 74/18576* (2015.01)

(58) Field of Classification Search
CPC ...... F16H 25/22; F16H 25/186; F16H 25/20; F16H 2025/228
USPC ....... 74/56–59, 89.23, 424.76, 424.9, 424.91
See application file for complete search history.

(56) References Cited

U.S. PATENT DOCUMENTS

| 1,005,763 | A | * | 10/1911 | Adams | F16H 25/122 74/57 |
| 3,153,986 | A | * | 10/1964 | Mitchell | F15B 15/068 74/58 |
| 3,916,701 | A | * | 11/1975 | Butler | B25J 9/045 414/728 |
| 4,195,816 | A | * | 4/1980 | Thompson | F16K 31/1635 251/229 |
| 5,373,754 | A | * | 12/1994 | Takei | F16H 25/2204 74/424.76 |
| 7,249,533 | B2 | * | 7/2007 | Inoue | F16H 25/2204 74/424.82 |

FOREIGN PATENT DOCUMENTS

| DE | 712235 C | 10/1941 |
| DE | 19953287 A1 | 5/2001 |
| DE | 102005006475 B3 | 5/2006 |
| JP | 10-142520 A | 5/1998 |
| JP | 2009-52670 A | 3/2009 |
| KR | 1998-061380 A | 10/1998 |
| KR | 100860720 B1 | 9/2008 |

OTHER PUBLICATIONS

German Office Action of DE Application No. 10-2014-002-478.4 dated on Sep. 22, 2014.
Chinese Office Action dated Dec. 4, 2015 in connection with the counterpart Chinese Patent Application No. 201410061907.9.

* cited by examiner

*Primary Examiner* — William C Joyce
(74) *Attorney, Agent, or Firm* — Hauptman Ham, LLP

(57) ABSTRACT

A nut screw conveying device includes a nut and a screw to convert rotational movement into translational movement. In the nut screw conveying device, a plurality of different threads is spirally formed on an inner circumferential surface of the nut, and the screw is provided with a plurality of rotating media to be respectively engaged with the different threads.

3 Claims, 4 Drawing Sheets

NUT SCREW CONVEYING DEVICE

CROSS-REFERENCE TO RELATED APPLICATION(S)

This application claims the benefit of Korean Patent Application No. 2013-0019782, filed on Feb. 25, 2013 in the Korean Intellectual Property Office, the disclosure of which is incorporated herein by reference.

BACKGROUND

1. Field

Embodiments of the present invention relate to a nut screw conveying device which allows flexible change of output stroke using a variable pitch nut.

2. Description of the Related Art

Generally, a nut screw conveying device uses a nut and a screw to convert rotational power into translational movement. The nut screw conveying device transmits power by rotating the nut or the screw and rectilinearly moving along mutually engaged threads.

Spiral inner circumferential grooves are formed on the inner circumferential surface of the nut, and spiral outer circumferential grooves are formed on the exterior of the screw to face the nut. Balls or bearings are provided between the screw and the nut in order to roll along the inner circumferential groove of the screw and the outer circumferential groove of the screw when the screw is rotated by the rotational power transmitted thereto to cause the nut to translate.

The nut of such a nut screw conveying device is configured to have a single pitch. Accordingly, when rotational power is converted into translational movement, the relation of an output stroke of the nut to a rate of rotation input to the screw is kept constant over the entire movement section.

Since the conventional nut screw conveying device as above operates with the relation of the output stroke of the nut to the rate of rotation input to the screw kept constant over the entire movement section, it may not be applicable to an apparatus in which the output stroke of the nut corresponding to a rate of rotation input to the screw varies over a certain section.

CITED REFERENCE

Patent Document

Korean Patent Application Publication No. 1998-061380 (Publication Date: Oct. 7, 1998)

SUMMARY

Therefore, it is an aspect of the present invention to provide a nut screw conveying device which may flexibly change the output stroke of a nut through a pattern of a variable pitch provided to the nut for the same rate of rotation of a screw by forming, on the inner circumferential surface of the nut, the same number of variable pitch threads as that of bearings or balls provided to the screw.

Additional aspects of the invention will be set forth in part in the description which follows and, in part, will be obvious from the description, or may be learned by practice of the invention.

In accordance with one aspect of the present invention, a nut screw conveying device includes a nut and a screw to convert rotational movement into translational movement, wherein a plurality of different threads is spirally formed on an inner circumferential surface of the nut, wherein the screw is provided with a plurality of rotating media to be respectively engaged with the different threads.

The different threads may be arranged with a variable pitch formed therebetween.

The rotating media may be mounted on the screw and disposed spaced a constant angle from each other.

The rotating media may include bearings or balls, wherein the threads may be formed in a shape corresponding to the rotating media.

BRIEF DESCRIPTION OF THE DRAWINGS

These and/or other aspects of the invention will become apparent and more readily appreciated from the following description of the embodiments, taken in conjunction with the accompanying drawings, of which.

DETAILED DESCRIPTION

Figure 1:
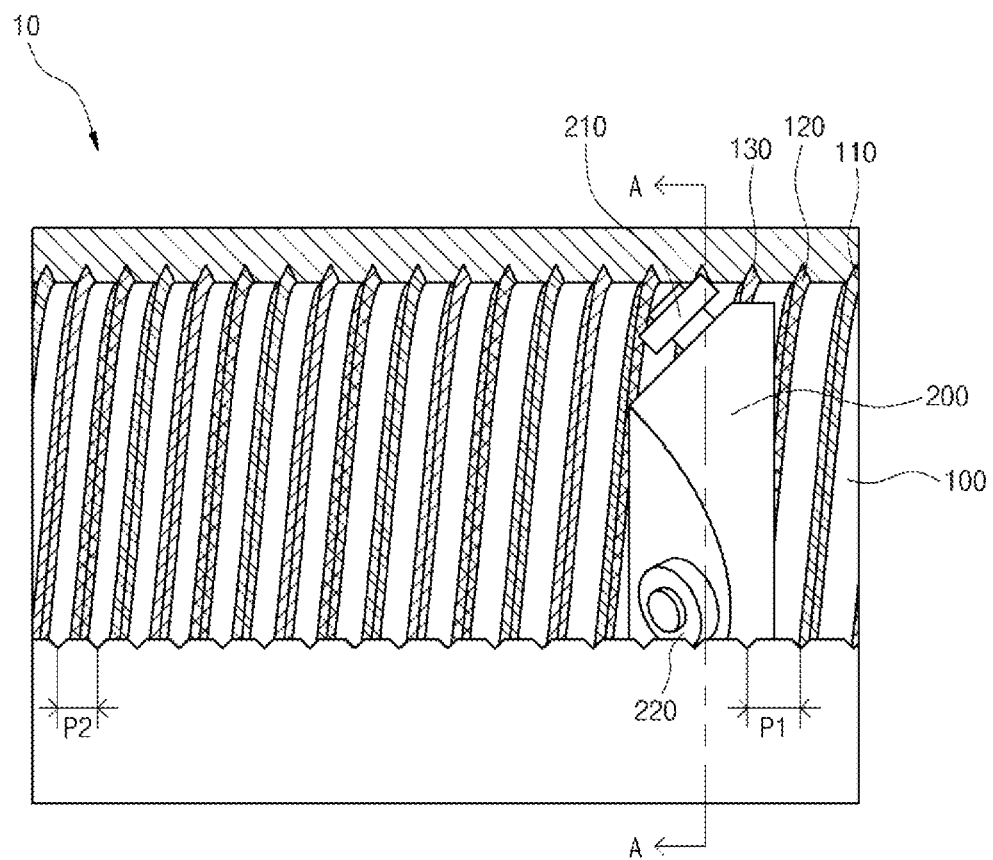
FIG. 1 is a cross-sectional view illustrating a nut screw conveying device according to an exemplary embodiment of the present invention.

Reference will now be made in detail to the embodiments of the present invention, examples of which are illustrated in the accompanying drawings. Embodiments disclosed below are exemplarily provided to sufficiently inform those skilled in the art of the spirit of the present invention. Rather than being limited to the embodiments described below, the present invention may be implemented in other forms. For clear illustration of the present invention, constituents unrelated to the description may not be shown in the drawings. The widths, lengths and thicknesses of some of the constituents shown in the drawings may be exaggerated for ease of the description. Like reference numerals refer to like elements throughout the specification.

Figure 2:
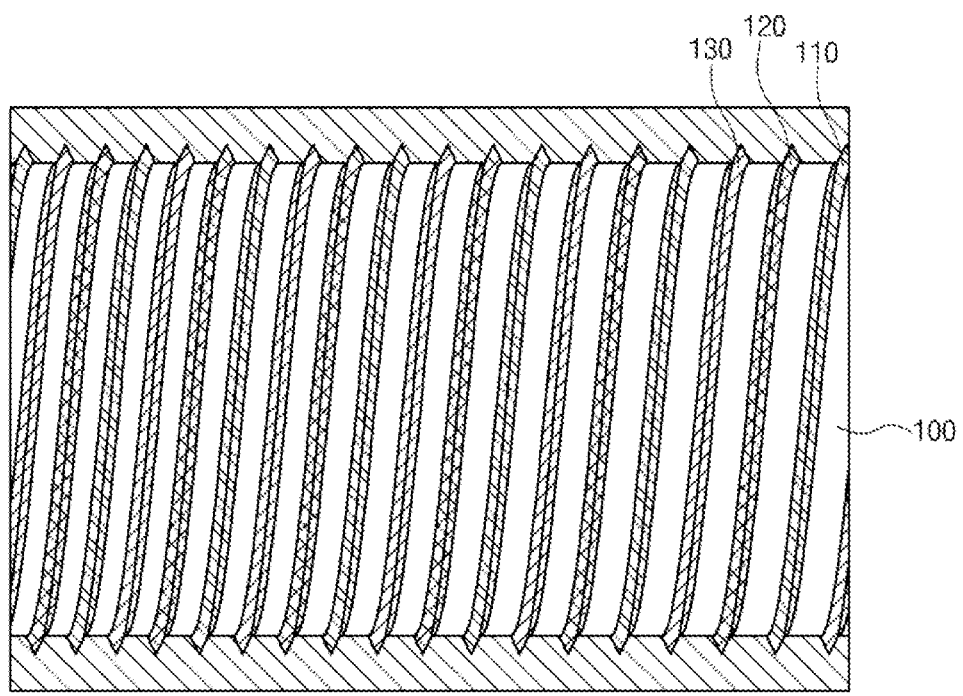
FIG. 2 is a cross-sectional view illustrating a nut having variable pitch threads according to one embodiment of the present invention.
Figure 3:
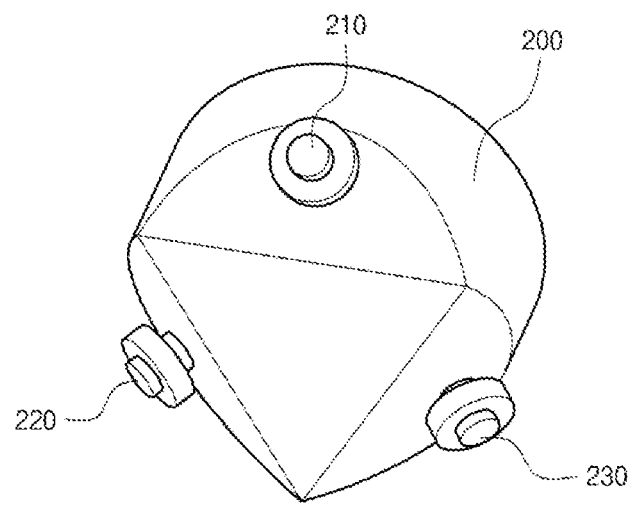
FIG. 3 is a perspective view illustrating a screw equipped with bearings according to one embodiment of the present invention.
Figure 4:
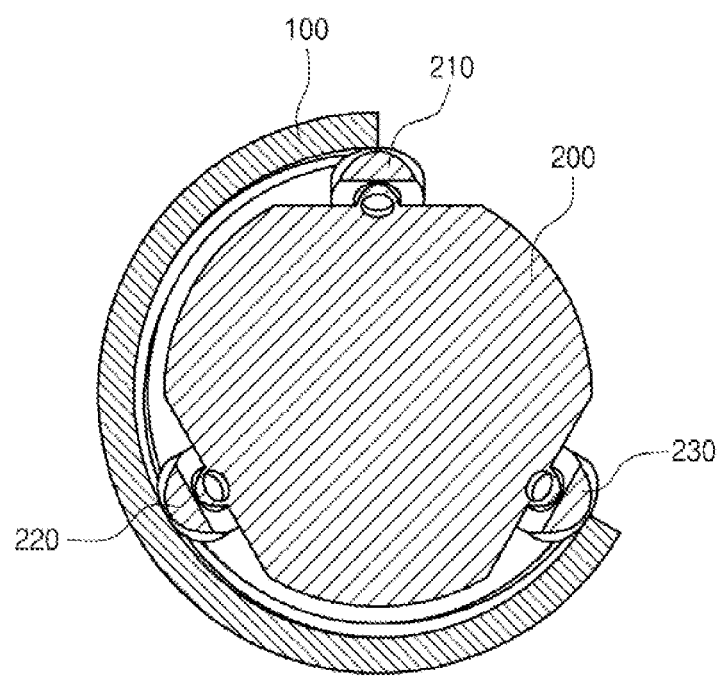
FIG. 4 is a cross-sectional view taken along line A-A of FIG. 1.

FIG. 1 is a cross-sectional view illustrating a nut screw conveying device 10 according to an exemplary embodiment of the present invention, with a nut 100 and a screw 200 coupled to each other. FIG. 2 is a cross-sectional view illustrating the nut 100 having threads with a variable pitch on the inner circumferential surface thereof, which is provided to the nut screw conveying device 10. FIG. 3 is a perspective view illustrating the screw 200 equipped with bearings provided of the nut screw conveying device 10, and FIG. 4 is a cross-sectional view taken along line A-A of FIG. 1.

Referring to FIG. 1, the nut screw conveying device 10 includes a nut 100 adapted to rectilinearly move and provided with threads spirally formed on the inner circumferential surface thereof, and a screw 200 on which bearings or balls corresponding to the threads formed on the inner circumferential surface of the nut 100 are mounted.

The nut will be exemplarily illustrated as having three different threads with a variable pitch, but embodiments of the present invention are not limited thereto. The nut may have a different number of variable pitch threads.

A plurality of different kinds of threads is spirally formed on the inner circumferential surface of the nut 100. The threads include a first thread 110, a second thread 120, and a third thread 130. The first thread 110 is engaged with a first rotating medium 210, and the second thread 120 is engaged with a second rotating medium 220. In addition, the third thread 130 is engaged with a third rotating medium 230.

The first, second and third threads are not disposed with a single pitch throughout the entire section of the inner circumferential surface of the nut 100, but are variably disposed on the inner circumferential surface of the nut 100 as desired by an operator.

That is, the pitch among the first thread 110, the second thread 120 and the third thread 130 varies. Accordingly, pitch P1 between the first thread 110 and the second thread 120 at a position on the nut 100 from which the screw 200 begins to rotate is greater than pitch P2 at another position on the nut 100.

The screw 200 is equipped with rotating media, the number of which is equal to the number of threads formed on the inner circumferential surface of the nut 100. The first rotating medium 210, the second rotating medium 220 and the third rotating medium 230, which are disposed on the screw 200, are spaced the same angle from each other. Referring to FIG. 3, the first rotating medium 210, the second rotating medium 220, and the third rotating medium 230 are spaced 120 degrees from each other around the center of the screw 200. Thereby, plural rotating media contacting variable pitch threads are positioned on the same cross section wherever the screw 200 may be positioned on the inner circumferential surface of the nut 100.

When the screw 200 rotates, the first rotating medium 210 mounted on the screw 200 is engaged with the first thread 110 on the inner circumferential surface of the nut 100 which the first rotating medium 210 faces, and the second rotating medium 220 is engaged with the second thread 120 on the inner circumferential surface of the nut 100. In addition, the third rotating medium 230 is engaged with the third thread 130 on the inner circumferential surface of the nut 100.

The rotating media may be configured with bearings or balls, and the threads arranged on the inner circumferential surface of the nut 100 to be engaged with the rotating media may be correspondingly configured.

Hereinafter, operation of a nut screw conveying device 10 according to one embodiment of the present invention will be described. The operation will be described assuming that three rotating media are provided for ease of illustration, as mentioned above. However, embodiments of the present invention are not limited thereto. The description may also be applicable to a case in which a different number of rotating media are mounted on the screw. It will also be assumed that power is connected to the screw 200, and the nut 100 makes translational movement. However, it may also be possible that the power source is connected to the nut and the screw makes translational movement on the inner circumferential surface of the nut.

In this embodiment, the screw 200 is connected to a power source, for example, a motor (not shown), and the nut 100 is arranged to translate. Three rotating media are disposed on the screw 200 and spaced 120 degrees apart from each other. Three threads are spirally formed on the inner circumferential surface of the nut 100, and the pitch between the threads is variable. Thereby, pitch P1 is greater than pitch P2.

The rotating media includes a first rotating medium 210, a second rotating medium 220, and a third rotating medium 230, and the threads includes a first thread 110, a second thread 120, and a third thread 130. The first rotating medium 210 is engaged with the first thread 110, the second rotating medium 220 is engaged with the second thread 120, and the third rotating medium 230 is engaged with the third thread 130.

When the screw 200 begins to rotate according to rotational movement of the power source, the first rotating medium 210 of the screw 200 rotates along the first thread 110, while the second rotating medium 220 rotates along the second thread 120, and the third rotating medium 230 rotates along the third thread 130.

The rotating media may be configured with bearings or balls, and the threads arranged on the inner circumferential surface of the nut 100 to be engaged with the rotating media may be correspondingly configured.

At the initial stage of operation with pitch P1 set to be long, the output stroke of the nut 100 increases although the rate of rotation of the screw 200 remains constant.

When the nut 100 reaches a section having short pitch P2 through translational movement according to rotation of the screw 200, the output stroke of the nut 100 decreases and increased torque is produced even though the rate of rotation of the screw 200 remains constant. The nut 100 transmits driving power of the increased torque to an object adapted to receive the power.

Thereby, in the case that the entire movement section needs to be divided into to a section in which the nut 100 moves fast and a section in which the nut 100 approaches an object to receive driving power with increased torque according to the distance between the nut 100 and the object, the nut screw conveying device 10 with the variable pitch nut 100 may allow the stroke of the nut 100 to flexibly change even when the rate of rotation of the screw 200 remains constant.

In addition, since plural rotating media mounted on the screw 200 are spaced the same angle from each other such that there is no step formed between the rotating media but there is phase difference therebetween, machining convenience and productivity may be enhanced. Thereby, manufacturing costs may be decreased and precision may be improved.

As is apparent from the above description, a nut screw conveying device according to an embodiment of the present invention may flexibly change the output stroke of a nut to a desired level through a pattern of a variable pitch provided to the nut for the same rate of rotation of a screw by mounting a plurality of bearings or balls on the screw and forming, on the inner circumferential surface of the nut, the same number of variable pitch threads as that of the bearings or balls.

In addition, since the bearings or balls are seamlessly mounted on the screw with angular difference therebetween, machining convenience and operational precision may be enhanced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A nut screw conveying device comprising:
 a nut having a plurality of threads spirally formed on an inner surface of the nut; and
 a screw having a plurality of rotating media, wherein
- each rotating media of the plurality of the rotating media is engaged with a corresponding thread of the plurality of threads, coupling the nut with the screw,
- each thread of the plurality of the threads is separated from an adjacent thread of the plurality of threads by a pitch,
- one or more of the pitches separating the threads of the plurality of the threads is different from at least one other pitch separating the threads of the plurality of threads,
- the nut or the screw is configured to be rotated, and the other of the nut or the screw is configured to translate based on a rotation of the nut or based on a rotation of the screw,
- the nut has a first section and a second section, a first pitch separating threads of the plurality of the threads in the first section is less than a second pitch separating threads of the plurality of the threads in the second section, and
- a difference between the first pitch and the second pitch is configured to cause an output stroke of the nut or the screw that is configured to translate to be decreased, and a torque of the nut or the screw that is configured to translate to be increased, based on a constant rotating speed of the other of the nut or the screw as the nut or the screw configured to translate moves from the second section to the first section, wherein the number of rotating media is equal to the number of threads formed on the inner circumference of the nut, and wherein each of the rotating media includes a bearing rotatably mounted on a rod, an axis of each of the rods extending at an angle from a central axis of the screw, the angle being less than 90 degrees.

2. The nut screw conveying device according to claim 1, wherein the rotating media are disposed spaced a constant angle from each other.

3. The nut screw conveying device according to claim 1, wherein the plurality of the threads of the nut are formed in a shape corresponding to the rotating media.

* * * * *